United States Patent
Seno et al.

(10) Patent No.: US 9,967,050 B2
(45) Date of Patent: May 8, 2018

(54) OPTICAL SIGNAL PROCESSING DEVICE

(71) Applicant: NIPPON TELEGRAPH AND TELEPHONE CORPORATION, Tokyo (JP)

(72) Inventors: Kazunori Seno, Musashino (JP); Kenya Suzuki, Atsugi (JP); Yuichiro Ikuma, Kanagawa-ken (JP); Yuzo Ishii, Kanagawa-ken (JP); Koichi Hadama, Kanagawa-ken (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 19 days.

(21) Appl. No.: 14/994,813

(22) PCT Filed: Jul. 16, 2014

(86) PCT No.: PCT/JP2014/003782
§ 371 (c)(1),
(2) Date: Jan. 13, 2016

(87) PCT Pub. No.: WO2015/008489
PCT Pub. Date: Jan. 22, 2015

(65) Prior Publication Data
US 2016/0197695 A1    Jul. 7, 2016

(30) Foreign Application Priority Data
Jul. 16, 2013   (JP) ................................. 2013-147735

(51) Int. Cl.
*H04J 14/02*   (2006.01)
*G02F 1/31*    (2006.01)
(Continued)

(52) U.S. Cl.
CPC .......... *H04J 14/0212* (2013.01); *G02B 26/08* (2013.01); *G02F 1/31* (2013.01); *H04B 10/548* (2013.01); *H04B 10/572* (2013.01)

(58) Field of Classification Search
CPC ........ H04J 14/0212; G02B 26/08; G02F 1/31; H04B 10/548; H04B 10/572
See application file for complete search history.

(56) References Cited

U.S. PATENT DOCUMENTS 8,780,319 B2 *   7/2014   Sakurai ................... G02F 1/035
                                                         349/196
9,660,723 B2 *   5/2017   Liu ..................... H04Q 11/0005
(Continued)

FOREIGN PATENT DOCUMENTS

JP     2005-242214     9/2005
JP     2008-224824     9/2008
(Continued)

OTHER PUBLICATIONS

Seno, et al., "Spatial Beam Transformer for Wavelength Selective Switch Integrated on Silica-Based Planar Lightwave Circuit", IEICE Technical Report, R201247, EMD2012-53,CPM2012-78,OPE2012-85,LQE2012-51(Aug. 2012), Aug. 2012, pp. 127-132.
(Continued)

*Primary Examiner* — Tesfaldet Bocure
(74) *Attorney, Agent, or Firm* — Workman Nydegger

(57) ABSTRACT

The invention provides a low-cost and easy-to-align optical signal processing device on which a plurality of WSS function units can be integrated using only a single lens. Optical signals input to the first input/output port group (101-1) are output into a space as collimated light via the microlens array (102). The signal light propagating through the space will be wavelength-demultiplexed by the diffraction grating (103), focused by the lens (104), and focused at the upper part in the drawing, with respect to the y-axis (Continued)

direction of the spatial light modulator (105). The light provided with a desired phase modulation and reflected by the spatial light modulator (105) is deflected at a desired angle in the y-z plane according to its phase setting, and further optically coupled to an arbitrary port by passing through the lens (104) again, thus the switching operation is completed.

19 Claims, 14 Drawing Sheets

(51) Int. Cl.
    *G02B 26/08*     (2006.01)
    *H04B 10/548*     (2013.01)
    *H04B 10/572*     (2013.01)

(56) References Cited

U.S. PATENT DOCUMENTS

| | | |
|---|---|---|
| 2004/0258351 A1 | 12/2004 | Ducellier et al. |
| 2007/0160321 A1* | 7/2007 | Wu .................. G02B 6/12021 385/24 |
| 2007/0211982 A1 | 9/2007 | Tsuda |
| 2011/0228374 A1 | 9/2011 | Ooba et al. |
| 2014/0016079 A1* | 1/2014 | Sakurai .................. G02F 1/035 349/196 |
| 2014/0072302 A1 | 3/2014 | Iwama et al. |
| 2017/0051885 A1* | 2/2017 | Hirasawa .................. F21K 9/64 |

FOREIGN PATENT DOCUMENTS

| | | |
|---|---|---|
| JP | 2009-53255 | 3/2009 |
| JP | 2011-53487 | 3/2011 |
| JP | 2014-67004 | 4/2014 |

OTHER PUBLICATIONS

Marom, et al., "Wavelength-Selective 1 × K Switches Using Free-Space Optics and MEMS Micromirrors: Theory, Design, and Implementation", IEEE J. Lightwave Technology, vol. 23, No. 4, Apr. 2005, pp. 1620-1630.

Seno, et al., "Spatial beam transformer for wavelength selective switch consisting of silica-based planar lightwave circuit", Optical Fiber Communication Conference and Exposition (OFC/NFOEC) Technical Digest, 2012, pp. 1-3.

Itoh et al., "Very low-loss arrayed waveguide grating with 1.5%-Δ waveguides", IEICE Technical Report, OPE2002-16, May 2002, pp. 27-30.

Seno et al., "Spatial Beam Transformer for Wavelength Selective Switch Monolithically Integrated on Silica-Based Planar Lightwave Circuit", IEICE Electronics Society Taikai, Electronics Koen Ronbunshu 1, Aug. 28, 2012, Electronics 1, p. 138.

International Search Report for PCT/JP2014/003782 dated Oct. 14, 2014.

English translation of International Preliminary Report on Patentability for PCT/JP2014/003782 dated Jan. 28, 2016.

* cited by examiner

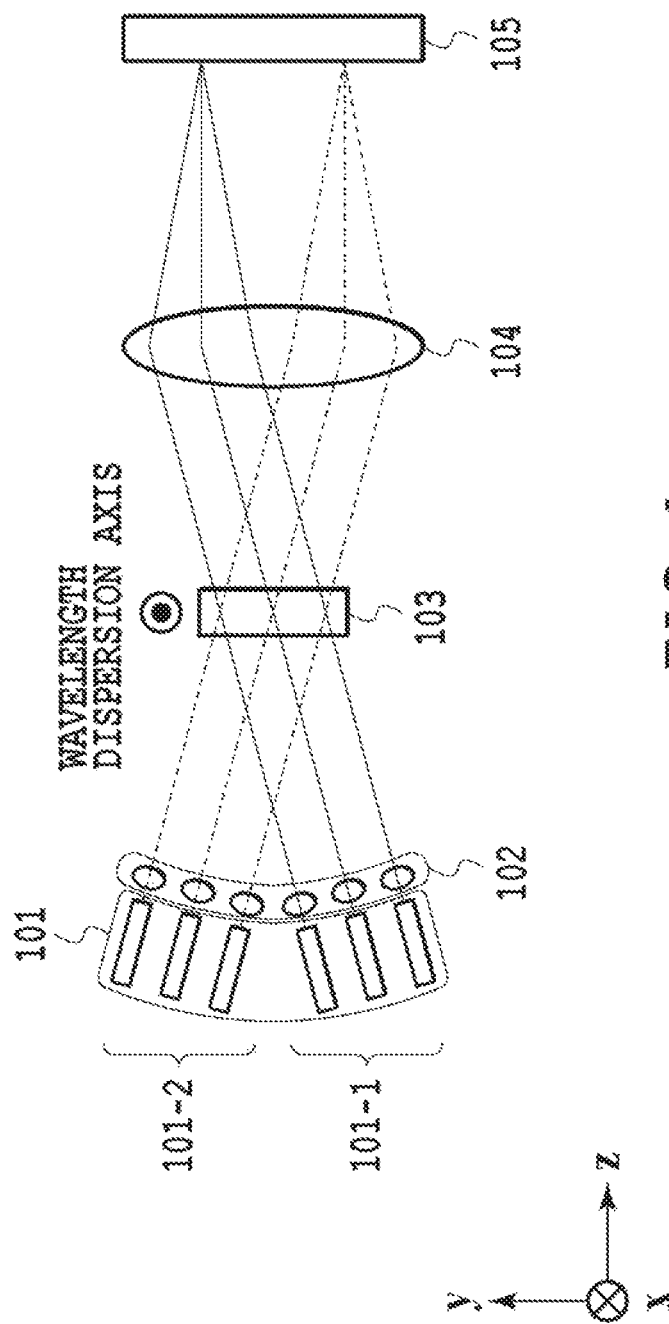

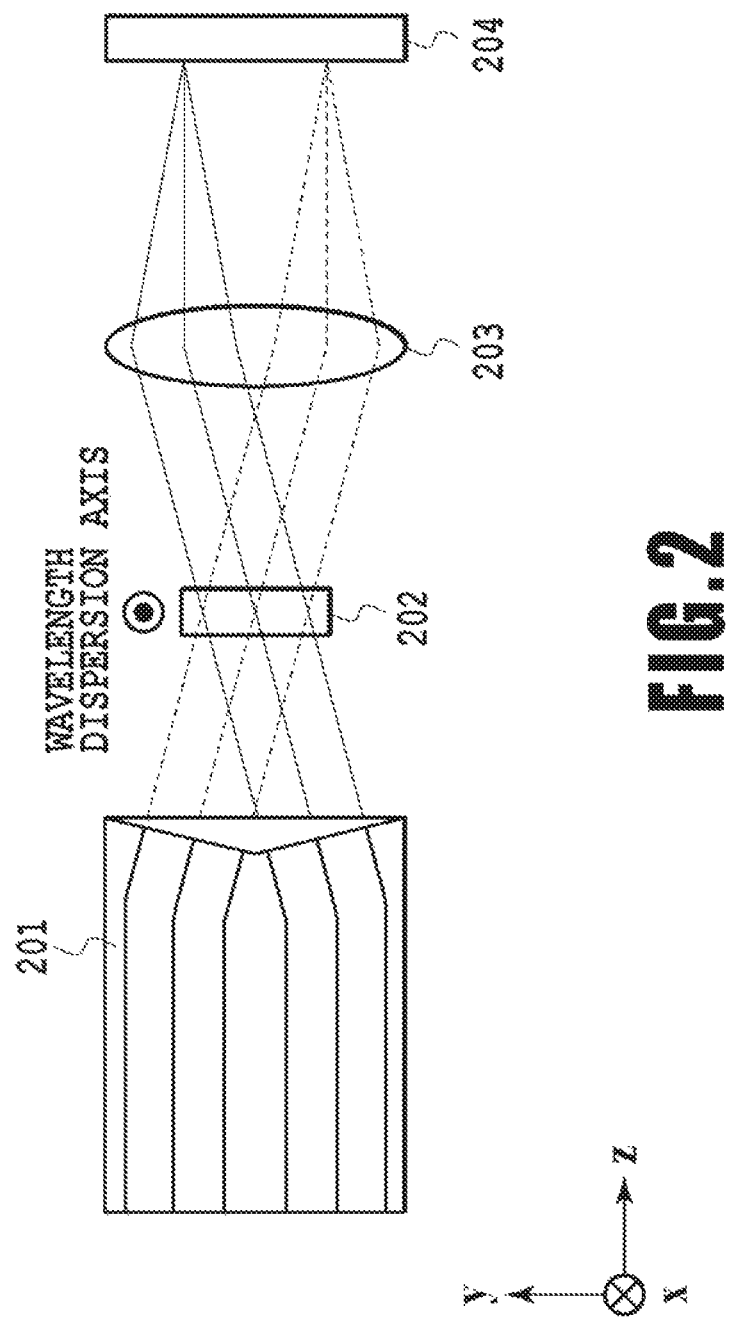

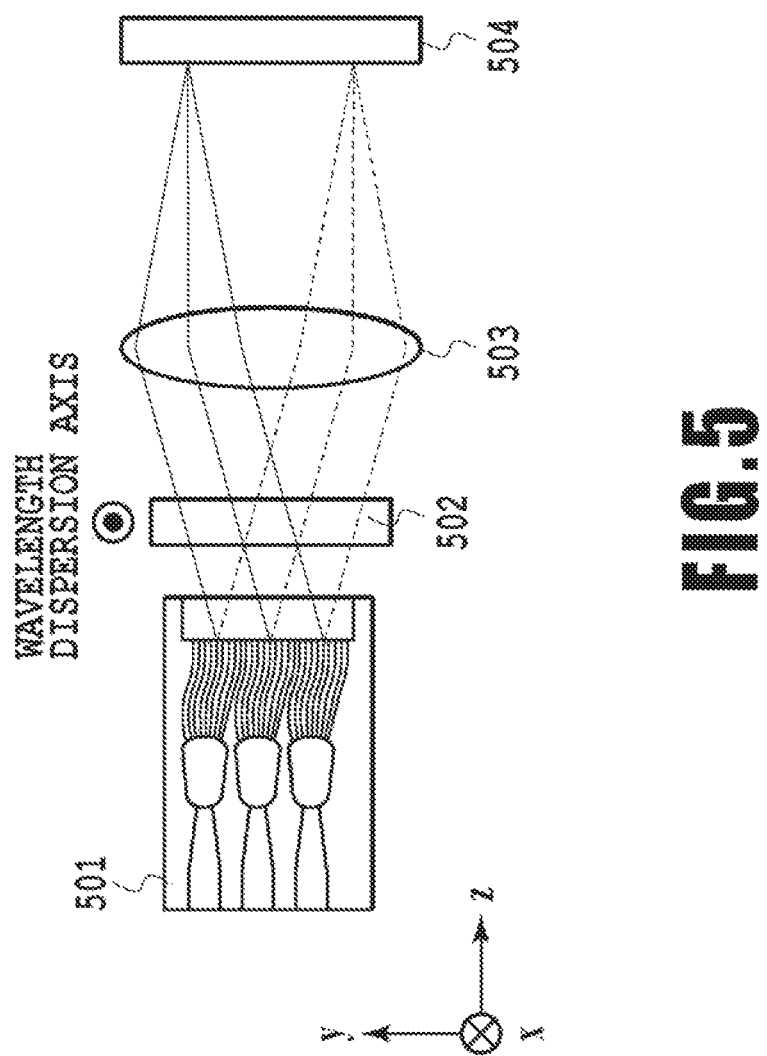

OPTICAL SIGNAL PROCESSING DEVICE

TECHNICAL FIELD

The present invention relates to an optical signal processing device that performs signal processing on an optical signal directly as the optical signal and integrates a plurality of functions therein.

BACKGROUND ART

Along with construction of large capacity optical communication networks showing rapid development in recent years, the Wavelength Division Multiplexing (WDM) communication technology is attracting attention, with a larger number of facilities being built therefor, and it is common in a WDM node to convert optical signals into electric signals once without directly controlling the optical signals and subsequently perform path switching.

However, there are concerns with the aforementioned method, such as overloaded processing capacity, communication speed limitation, and high power consumption in the node. Accordingly, there is increasing importance of transparent network systems represented by ROADM (Reconfigurable Optical Add/Drop Multiplexer) configured to perform signal processing on optical signals directly as the optical signals without via electric switching, and therefore intensive development of optical devices constituting a ROADM such as a Wavelength Selective Switch (WSS) or a Tunable Optical Dispersion Compensator (TODC) is under way.

A general configuration and an operation principle for an optical signal processing device such as a WSS and a TODC will be described. A WDM signal input via an input optical fiber is propagated by a collimator through a space as collimated light and focused again via a lens after having passed through a plurality of lenses and a diffraction grating configured to perform wavelength demultiplexing. A Spatial Light Modulator (SLM) configured to provide the optical signal with a desired phase variation is arranged at the focusing position.

As a typical example of the aforementioned SLM, there may be mentioned a micro mirror array, a liquid crystal cell array, a DMD (Digital mirror device), an LCOS (Liquid crystal on silicon) or the like according to the MEMS (Micro-electro mechanical system) technology, by which each of the optical signals is provided with a desired phase variation and reflected. Each of the reflected optical signals is incident on a diffraction grating via a lens, wavelength multiplexed, and subsequently coupled to an output fiber via a lens.

When using an optical signal processing device as a compensation device represented by a TODC, there is frequently used a method that separates the signals before and after compensation using a circulator, unifying the input fiber and the output fiber. In addition, a switching device such as a WSS may be configured to have at least one input fiber and also a plurality of output fibers so as to cause the signal light incident from the input fiber to be output from an output fiber selected via the SLM. Deflecting the signal lights at desired angles by the SLM allows selecting the output fiber in which the reflected signal lights are coupled and switching.

With regard to a WDM node, there is disclosed a form of simultaneously implementing a plurality of such optical signal processing devices as described above (see Non Patent Literature 1).

FIG. 8 is a diagram illustrating a configuration of an optical signal processing device having a plurality of the conventional WSSs implemented in a single node. For an optical signal which has entered an optical node, a WSS group 801 sets a drop- or a through-path in a wavelength selective manner. For each of optical signals dropped by the WSS group 801, a wavelength demultiplexing function unit group 802 determines a path according to the wavelength, and the optical signal enters a receiver group 803 to reach a desired receiver. On the other hand, optical signals transmitted from a transmitter group 804 in the optical node pass through a wavelength multiplexing function unit group 805 and are transferred by a WSS group 806 to adjacent nodes.

In such a form, the wavelength and the route are determined (Colored/Directed) in accordance with the position of a port which inputs an optical signal to an optical node or receives an optical signal from an optical node. Accordingly, there are proposed various forms such as an approach (Colorless) which allows transmission and reception of signals of any wavelength by replacing the wavelength demultiplexing function unit group 802 and the wavelength multiplexing function unit group 805 with a WSS group in order to provide a more flexible functionality, or an approach (Directionless) which allows transmission and reception of signals from any route by inserting a matrix switch group respectively between the wavelength demultiplexing function unit group 802 and the receiver group 803, and between the transmitter group 804 and the wavelength multiplexing function unit group 805.

Here, it is often the case in either form that, with a combination of an add-WSS and a drop-WSS being as a single set, there are needed as many WSS sets as the number of routes in a wavelength cross connect function unit 807 illustrated in FIG. 8. Accordingly, the low cost N-in-1 WSS having two or more sets of WSS functions integrated in a single device is very attractive due to many merits such as suppressed initial introduction cost, reduced power consumption, and reduced load on the control system. It goes without saying that functions to be integrated in a single device is not limited to N sets of WSS functions, and different functional forms such as WSS and TODC or the like may also exhibit a high effect.

FIGS. 9A and 9B illustrate a conceptual diagram of a general configuration of an optical signal processing device having a plurality of functions integrated therein. The functions to be integrated in the optical signal processing device are assumed to be two sets of WSS functions, with the direction of wavelength demultiplexing by the diffraction grating defined as the x-axis, the traveling direction when an optical signal is output from the fiber defined as the z-axis, and the direction perpendicular to the x-axis and the z-axis defined as the y-axis. In addition, although it is assumed for ease of explanation that there is one input port and two output ports in one WSS, but the number and configuration are not limited to those in the following description (see Non Patent Literature 2). In addition, the chief ray of an optical signal output from the first WSS function unit is indicated by a solid line, and the chief ray output from the second WSS function unit is indicated by a dashed line, respectively.

Firstly, the configuration of FIG. 9A will be described. Input and output of optical signals are performed via an input/output port group 901, and the input/output port group 901 can be divided into a first input/output port group 901-1 corresponding to the first WSS function unit and a second input/output port group 901-2 corresponding to the second WSS function unit. In the configuration in FIG. 9A, the first input/output port group 901-1 is exemplified as the lower three ports in FIG. 9A, and the second input/output port group 901-2 is exemplified as the upper three ports. The traveling directions of the optical signals respectively output from the first input/output port group 901-1 and the second input/output port group 901-2 are all parallel, and correspond to the z-axis in the present example.

The optical signal output from the input/output port group 901 to the space propagates while spreading by a certain Numerical aperture (NA) according to the diameter of the beam which has been trapped in the port. Generally, the input/output port group 901 is often implemented by a combination of an optical fiber array and the microlens array 902 so that the optical signal output from the port turns into collimated light. The optical signal that has propagated through the space is Fourier transformed and the position/angle transformed by a lens group 903 provided in a distributed manner for each WSS function unit. Subsequently, the optical signal enters a diffraction grating 905 at a predetermined angle for each WSS function unit via a lens 904 to be wavelength-demultiplexed in the x-axis direction, and further is focused onto a spatial light modulator 907 via a lens 906.

The spatial light modulator 907 has a beam deflection function, whereby it becomes possible to switch the output ports by appropriately controlling the deflection angle. On this occasion, optical design is made such that optical axes associated with the first input/output port group 901-1 intersect at a single point located at the upper part of the spatial light modulator 907 in FIG. 9A, and optical axes associated with the second input/output port group 901-2 intersect at a single point located at the lower part thereof. In other words, the optical signals focused on the spatial light modulator 907 will be independently focused on different positions in the y-axis direction for each WSS function unit. Setting the deflection angle independently for each WSS function unit using the spatial light modulator 907 can realize two sets of WSS functions in a single device.

The configuration of optical signal processing device having integrated therein a plurality of functions is not limited to that illustrated in FIG. 9A. FIG. 9B is an exemplary configuration in which the lens group 903 and the lens 904 in the configuration of FIG. 9A are omitted. Also in the example, the traveling directions of the optical signals output respectively from both of the first input/output port group 901-1 and the second input/output port group 901-2 are parallel, and correspond to the z-axis in the present example. In order to focus light at different positions on the spatial light modulator 907 for each WSS function unit, the lens 906 previously having a single-lens configuration is turned into a two-lens configuration with each lens being separately arranged for each function unit, whereby integration of a plurality of functions can be realized.

CITATION LIST

Non Patent Literature

NPL 1: SENO, et al., "Spatial Beam Transformer for Wavelength Selective Switch Integrated on Silica-Based Planar Lightwave Circuit", August 2012 Workshop, Component Parts and Materials, Tohoku University, Technical Report of IEICE. vol. 112, no. 182, CPM2012-78 pp. 127-132,
NPL 2: Dan M. Marom, et al., "Wavelength-Selective 1×K Switches Using Free-Space Optics and MEMS Micromirrors: Theory, Design, and Implementation," IEEE J. Lightwave Technology, 2005, Vol. 23, No. 4, pp. 1620-1630

SUMMARY OF INVENTION

Technical Problem

However, when realizing such an optical signal processing device having integrated therein a plurality of functions as described above, the exemplary configuration of FIG. 9A has a problem of being disadvantageous in terms of size and cost from a viewpoint such as overall length of the optical system becoming long, or preparation of extra lenses being required.

Although it is possible in the exemplary configuration of FIG. 9B to shorten the length of the optical system, there is required a lens having a structure suited for stacking in the y-axis direction. This point may become a significant demerit with regard to both design and implementation.

For example, there is a problem with the lens 906 divided in the y-axis direction that a sufficient margin is required for the thickness in the y-axis direction of the lens 906 so that the signal light output from the first input/output port group 901-1 and the signal light output from the second input/output port group 901-2 will not enter the adjacent lens. Although there is no problem when the thickness of the entire device does not matter, the thickness is generally a very important parameter for an optical communication device, and therefore it is not desirable that unnecessary margin is stacked in the y-axis direction.

Additionally, in terms of implementation, although providing two lenses fixed by adhesion is a simple form of implementation, there is a problem that a highly precise implementation is required particularly for positioning the lenses with the input/output port group in the y-axis direction, and therefore alignment of the optical system is not easy. On the other hand, although alignment is easier in the case of a structure that holds two lenses independently, there is a problem that the thickness in the y-axis direction increases due to the increase of margin provided in relation with the alignment, together with further concerns about increased number of members and decreased reliability, which may lead to increased cost.

As has been described above, the separated arrangement of the lenses is inevitable as long as the traveling directions of the optical signals output respectively from both of the first input/output port group 901-1 and the second input/output port group 901-2 are parallel and, as a result, there is a strong desire for a configuration method that allows low cost and simplified alignment.

It is an object of the present invention, which has been made in view of the above problems, to provide a low-cost and easy-to-align optical signal processing device on which a plurality of WSS function units can be integrated using only a single lens.

Solution to Problem

In order to solve the aforementioned problems, an aspect of the invention is an optical signal processing device including: M light input/output units (M being an integer of 2 or more) each having N input/output ports (N being an integer of 1 or more); a spectroscopic unit configured to perform wavelength demultiplexing of optical signals output from the M light input/output units; a focusing unit configured to respectively focus the optical signals dispersed for every wavelength by the spectroscopic unit; and a spatial light modulating unit configured to perform phase modulation on each of the optical signals focused by the focusing unit, wherein traveling directions of the optical signals output from the M light input/output units are different from one another.

Additionally, in another aspect of the invention, chief rays of light output from the N input/output ports of each of the light input/output units respectively intersect on the same plane with one of chief rays of light output from the N input/output ports of the other light input/output unit.

Additionally, in another aspect of the invention, the light input/output unit consists of a planar lightwave circuit.

Additionally, in another aspect of the invention, the planar lightwave circuit includes a slab waveguide provided at an input/output end on the side of the spectroscopic unit.

Additionally, in another aspect of the invention, the planar lightwave circuit includes a numerical aperture control mechanism configured to control a numerical aperture of light output from the planar lightwave circuit into a space.

Additionally, in another aspect of the invention, the numerical aperture control mechanism includes a tapered structure in which a waveguide width of the planar lightwave circuit varies according to the traveling direction of light in a waveguide.

Additionally, in another aspect of the invention, the numerical aperture control mechanism includes a slab waveguide and a lens mechanism having a power only in a plane of the planar lightwave circuit.

Additionally, in another aspect of the invention, the numerical aperture control mechanism includes at least one slab waveguide and an array waveguide connected to the slab waveguide.

Additionally, in another aspect of the invention, all the waveguides in the array waveguide have the same length.

Additionally, in another aspect of the invention, the total sum of the numerical aperture control mechanisms is less than N×M.

Advantageous Effects of Invention

The present invention allows further cost reduction and simplification of alignment due to reduction of optical members by reducing the number of lenses used to integrate a plurality of WSS function units, exhibiting an effect to facilitate alignment with a low cost, and further employing a PLC (Planar lightwave circuit) for the input/output unit of signal light.

BRIEF DESCRIPTION OF DRAWINGS

FIG. 1 is a diagram illustrating a configuration of an optical signal processing device according to Embodiment 1 of the present invention;

FIG. 2 is a diagram illustrating a configuration of an optical signal processing device according to Embodiment 2 of the present invention;

FIG. 5 is a diagram illustrating a configuration of an optical signal processing device according to Embodiment 3 of the present invention;

DESCRIPTION OF EMBODIMENTS

Embodiment 1

Figure 3A:
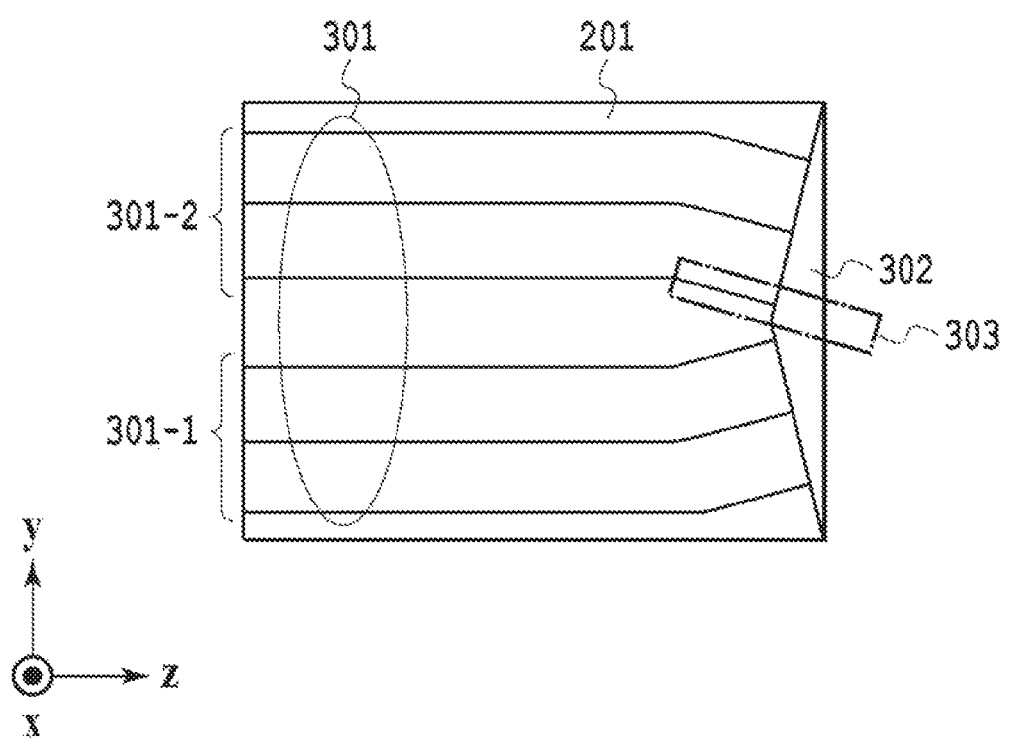
FIG. 3A is a diagram illustrating a detailed configuration of an optical waveguide substrate 201 in Embodiment 2.

In the following, an embodiment of the present invention will be described, but the invention is not limited thereto.

FIG. 1 illustrates a configuration of an optical signal processing device according to Embodiment 1 of the invention. The optical signal processing device according to Embodiment 1 has an input/output port group 101, a microlens array 102, a diffraction grating 103, a lens 104, and a spatial phase modulator 105 arranged in this order. Although only one set of the lens 104 is used in the description of the present embodiment, there is no problem with using any number of lenses or using any arrangement of lenses in a configuration having similar optical characteristics. Depending on the optical system design, there may also be a configuration that arranges the lens 104 midway between the microlens array 102 and the diffraction grating 103. In addition, with the purpose of reducing aberration and shortening the optical system, a structure may be employed in which two sets of the lens 104 are arranged so as to sandwich the diffraction grating 103.

In the description of Embodiment 1, it is described assuming that regarding the optical signals respectively output from a first input/output port group 101-1 and a second input/output port group 101-2, the closer to the diffraction grating 103, the closer an optical signal output from the first input port group 101-1 and an optical signal output from the second input port group 101-2 approach each other. However, there is no problem with a configuration such that the optical signals respectively output from the first input/output port group 101-1 and the second input/output port group 101-2 separate further away from each other as the output beams travel through the space.

The operation of the optical signal processing device of the invention is as follows, taking as an example a function unit associated with the first input/output port group 101-1. Firstly, optical signals input to the first input/output port group 101-1 are output into a space as collimated light via the microlens array 102. The signal light propagating through the space is wavelength-demultiplexed by the diffraction grating 103, focused by the lens 104, and focused at the upper part in the drawing, in the y-axis direction of the spatial light modulator 105. The light provided with a desired phase modulation and reflected by the spatial light modulator 105 is deflected at a desired angle in the y-z plane according to its phase setting, further optically coupled to an arbitrary port by passing through the lens 104 again, and the switching operation is completed.

Since optical signals associated with the second input/output port group 101-2 are emitted into space at a different angle from that of optical signals associated with the first input/output port group 101-1, it turns out that light is focused at the lower part in the drawing on the spatial light modulator 105, and therefore the optical signals associated with the first input/output port group 101-1 and the second input/output port group 101-2 can be regarded as being respectively independent optical systems, whereby integration of a plurality of functions can be realized.

The present embodiment is characterized in that a plurality of sets of the lens 104 needs not be separately arranged in the y-axis direction by setting respective installation angles of the first input/output port group 101-1 and the second input/output port group 101-2, among the lens input/output port groups, not to be parallel but to a certain limited value.

Figure 9A:
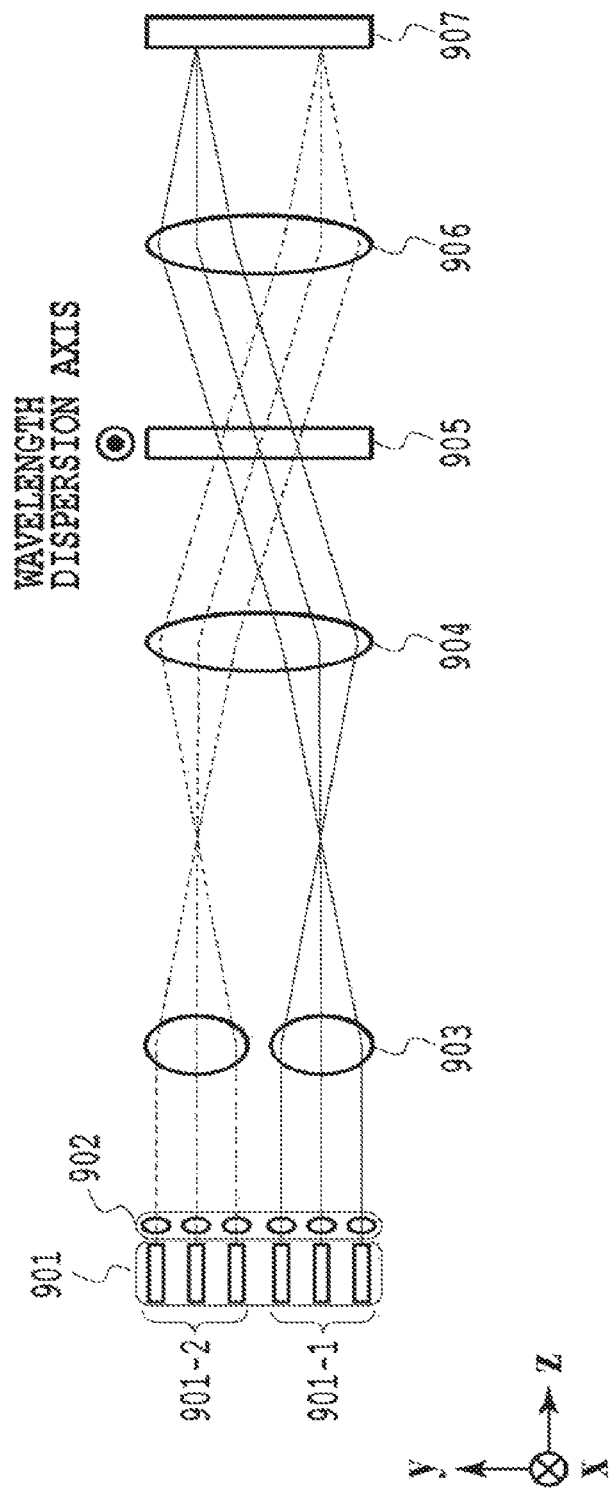
FIG. 9A is a conceptual diagram of a general configuration of the optical signal processing device having a plurality of functions integrated thereon.

The lens, being a Fourier transform element, has a function of converting the position into the phase (angle) of incident light, or vice versa. Therefore, it is necessary to change respective angles at the preceding stage of the lens 104 in order to focus light at different positions on the spatial light modulator 105 for each WSS function unit. In a commonly used fiber array, however, fibers are respectively arranged in parallel, and thus using only one set of the lens 104 results in focusing light at the same position on the spatial light modulator 105 with different incidence angles, whereby it is impossible to perform independent control. Accordingly, in order to realize a multi-function-integrated optical device, there is no other way than to employ the form illustrated in FIGS. 9A and 9B as long as a normal fiber array is used, and therefore the lens shape being separately arranged in the y-axis direction is essential.

Figure 9B:
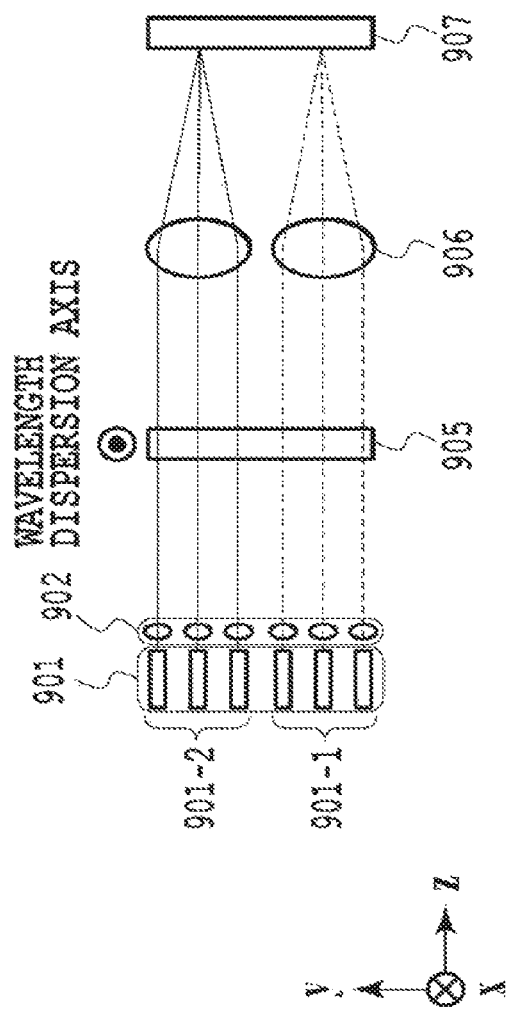
FIG. 9B is a conceptual diagram of a general configuration of the optical signal processing device having a plurality of functions integrated thereon.

Furthermore, in the configuration of FIG. 9B, the light passing through the diffraction grating 905 is widely distributed in the y-axis direction and therefore it is necessary to prepare the diffraction grating 905 with a sufficient area so as not to cause vignetting. A diffraction grating belongs to an expensive element among the large number of optical elements, and its price is proportional to the area. In consideration of this point, employing the configuration of arranging the diffraction grating 103 at the focal position of the lens 104 in Embodiment 1 can suppress the area of diffraction grating 103 to about half that of the conventional one, allowing further cost reduction. As stated above, Embodiment 1 solves the aforementioned problems that the prior art has, and can realize a low-cost but easy-to-implement optical signal processing device.

Embodiment 2

FIG. 2 illustrates a configuration of an optical signal processing device according to Embodiment 2 of the invention. In Embodiment 2, an optical waveguide substrate 201, a diffraction grating 202, a lens 203, and a spatial phase modulator 204 are arranged in this order. Although only one set of the lens 203 is used in the description of the present embodiment, there is no problem with using any number of lenses or using any arrangement of lenses in a configuration having similar optical characteristics. Depending on the optical design, there may also be a configuration to arrange the lens 203 midway between the optical waveguide substrate 201 and the diffraction grating 202. In addition, since beams output from the optical waveguide substrate 201 into a space generally have a high numerical aperture (NA), it is also possible to include a function of adjusting the NA in the optical waveguide substrate 201, or employ a unit configured to adjust the NA of the beams output into the space by arranging a microlens, a cylindrical lens or the like in the vicinity of the optical waveguide substrate 201, details of which will be described below.

FIG. 3A illustrates a detailed configuration of the optical waveguide substrate 201 in Embodiment 2. As illustrated in FIG. 3A, the optical waveguide substrate 201 has a first input/output port group 301-1 and a second input/output port group 301-2 as input/output units of optical signals, and further has a slab waveguide 302 on an end face from which beams are emitted into a space. In the slab waveguide 302, the angles of each of the input/output ports and the slab waveguide 302 are adjusted so that the slab waveguide 302 is coupled to each of the first input/output port group 301-1 and the second input/output port group 301-2 at different angles, and the beams are output into the space.

Figure 3B:
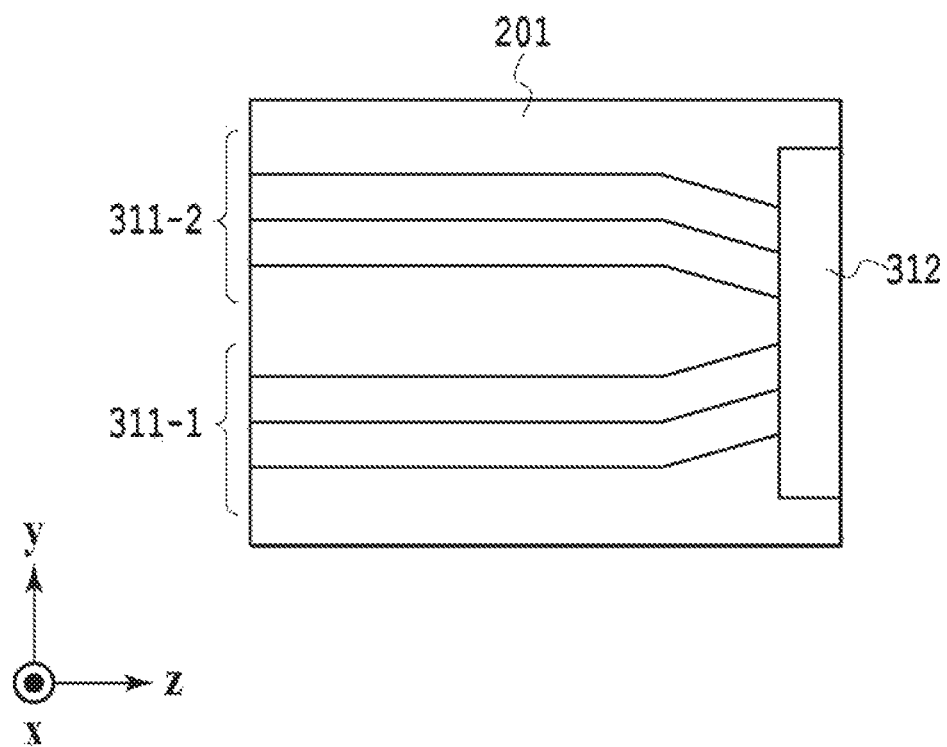
FIG. 3B is a diagram illustrating a detailed configuration of another optical waveguide substrate 201 in Embodiment 2.

In the description of Embodiment 2, it is explained assuming that the closer to the end face, which emits beams to the space, of the optical waveguide substrate 201, the closer the optical signal output from the first input/output port group 301-1 and the optical signal output from the second input/output port group 301-2 approach each other, and thus the slab waveguide 302 is described as an isosceles triangle having its apex on the middle between the first input/output port group 301-1 and the second input/output port group 301-2 with regard to the y-axis direction. However, there may also be a configuration such that the closer the first input/output port group 301-1 and the second input/output port group 301-2 approach the end face, which emits beams to the space, of the optical waveguide substrate 201, the further the optical signals separate away from each other. Furthermore, a waveguide may be provided so that the optical signals are output into the space via a rectangular slab waveguide 312 as illustrated in FIG. 3B, when the optical signal output from the first input/output port group 311-1 and the optical signal output from the second input/output port group 311-2 approach each other.

The operation of the optical signal processing device of the invention is as follows, taking as an example a function unit associated with the first input/output port group 301-1. Firstly, optical signals input to the first input/output port group 301-1 propagate through waveguides whose lengths and angles have been adjusted so as to be output into a space with appropriate angles and positions with regard to each other, and are output into the space from the optical waveguide substrate 201 via the slab waveguide 302. The signal light output into the space will be wavelength-demultiplexed by the diffraction grating 202, focused by the lens 203, and focused at the upper part in the drawing, in the y-axis direction, of the spatial light modulator 204. The light provided with a desired phase modulation and reflected by the spatial light modulator 204 is deflected at a desired angle in the y-z plane according to its phase setting and further optically coupled to an arbitrary port bypassing through the lens 203 again, and the switching operation is completed.

Since optical signals associated with the second input/output port group 301-2 are output into a space at a different angle from that of optical signals associated with the first input/output port group 301-1, it turns out that light is focused at the lower part in the drawing, of the spatial light modulator 204, and therefore the optical signals associated with the first input/output port group 301-1 and the second input/output port group 301-2 can be regarded as being respectively independent optical systems, whereby integration of a plurality of functions can be realized.

Here, the NA of an optical signal propagating through a space is extremely important information in the optical design, relating to the height and optical length of the entire optical system, design of aberration, and further the size of member, and thus has a great influence even on the cost. Therefore, it is desirable to provide a unit configured to adjust the NA, i.e., the beam diameter, in the boundary region between respective input/output waveguides of the first input/output port group 301-1 and the second input/output port group 301-2 and the slab waveguide 302.

FIGS. 4A to 4D illustrate a waveguide structure for adjusting the beam diameter of the input/output waveguide of the optical waveguide substrate. FIGS. 4A to 4D are extracted views of the region 303 surrounded by the dashed line in FIG. 3A.

Figure 4A:
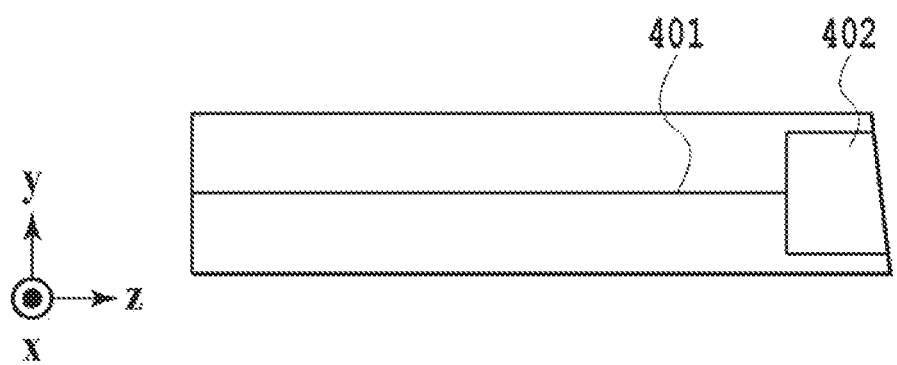
FIG. 4A is a diagram illustrating a waveguide structure for adjusting the beam diameter of an input/output waveguide of the optical waveguide substrate.
Figure 4B:
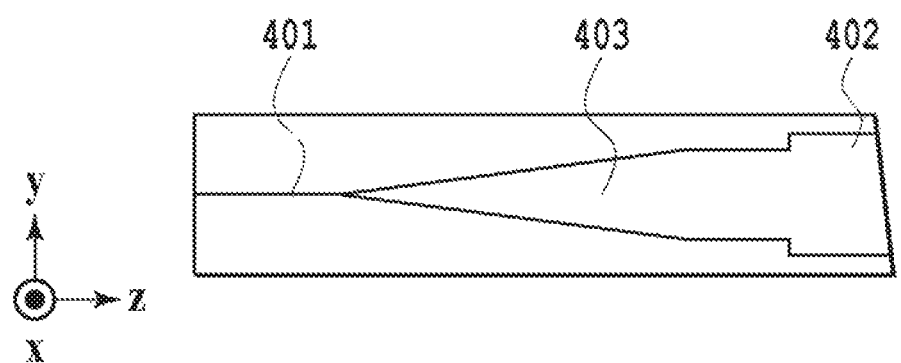
FIG. 4B is a diagram illustrating a waveguide structure for adjusting the beam diameter of an input/output waveguide of an optical waveguide substrate.
Figure 4C:
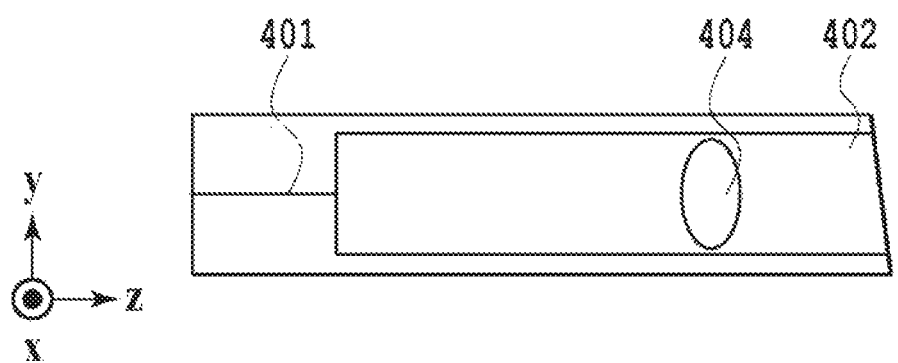
FIG. 4C is a diagram illustrating a waveguide structure for adjusting the beam diameter of an input/output waveguide of an optical waveguide substrate.
Figure 4D:
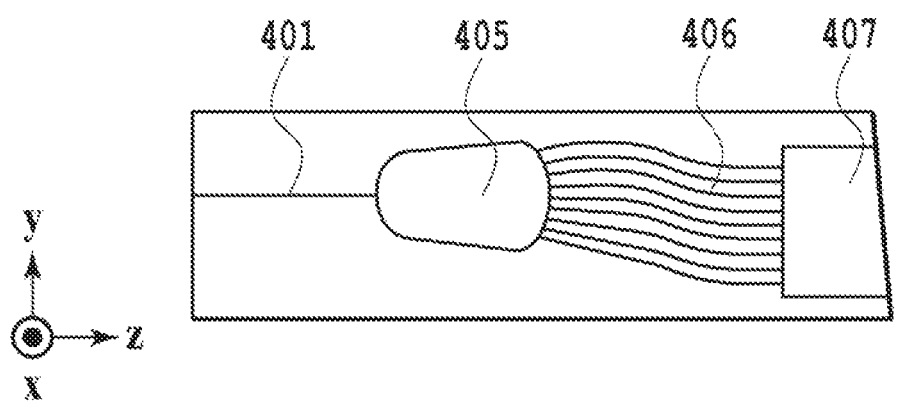
FIG. 4D is a diagram illustrating a waveguide structure for adjusting the beam diameter of an input/output waveguide of an optical waveguide substrate.

FIG. 4A illustrates a system employed in the configuration illustrated in FIG. 3A, in which a straight waveguide 401 corresponding to the input/output waveguide and a slab waveguide 402 are connected. Optical signals propagated from the slab waveguide 402 have a large NA due to the thin straight waveguide 401 providing a very strong trapping. FIGS. 4B to 4D illustrate an example of controlling the NA to be smaller than the system illustrated in FIG. 4A.

FIG. 4B illustrates an example of arranging, between the straight waveguide 401 and the slab waveguide 402, a tapered waveguide 403 whose width gradually becomes wider, starting from the waveguide width of the straight waveguide 401. The light propagated in a heat insulated manner via the tapered waveguide has a function of converting the beam diameter, allowing to enlarge the beam diameter with a simple design.

FIG. 4C is an example of incorporating, in the slab waveguide 402, a lens function unit 404 having a function of a convex lens. As a method of realizing the lens function unit, arranging a substance having a different refractive index from the refractive index of the straight waveguide 401, such as resin or air, for example, in a suitable form, allows the beam to be collimated while propagating through the optical waveguide substrate 201.

FIG. 4D illustrates an arrangement of the first slab waveguide 405, an array waveguide 406, and a second slab waveguide 407 equivalent to the aforementioned slab waveguide 402 next to the straight waveguide 401 in this order. Although the configuration has a structure similar to that of an AWG (Arrayed-Waveguide Grating) generally used as a wavelength multiplexing and demultiplexing device, the substrate surface is arranged in parallel with the direction Y which is perpendicular to the spectroscopic optical axis X. In addition, a structure is desired such that the difference of optical path lengths of adjacent array waveguides is equal (i.e., $\Delta L=0$).

In the configuration of FIG. 4D, since the first slab waveguide 405 has a beam spreading function due to free space propagation and also a lens function, and the array waveguide 406 has a phase correcting function of each waveguide, it is possible to form the beam output from the second slab waveguide 407 as a planar wave which is sufficiently thick in the y-axis direction. Although the second slab waveguide 407 is not essential in the optical signal processing device of the invention, it is preferred to be installed because of the following reason. When using quartz-based optical waveguide formed on a silicon wafer as the optical waveguide substrate 201, the output end face into the space needs to be polished to form an optical surface. On this occasion, it is difficult to precisely control the amount of abrasion due to polishing, i.e., the polishing margin, and therefore it is desirable to provide a region that can be considered as a free space in the waveguide, i.e., the second slab waveguide 407 at the output end on the space side. It is preferred to secure a sufficient length for the second slab waveguide 407, as the polishing margin.

A has been represented in the foregoing, changing the circuit layout in the boundary region between respective input/output waveguides of the first input/output port group 301-1 and the second input/output port group 301-2, and the slab waveguide illustrated in FIGS. 3A and 3B, allows adjustment of the beam diameter, i.e., adjustment of NA without installing a load component such as a microlens.

It goes without saying that the NA adjustment method is not limited to the approach illustrated in FIGS. 4A to 4D, and a circuit design with a plurality of approaches combined together may be employed, or a completely different configuration may be used.

Embodiment 2, taking the form of integrating all of the input/output port groups 101 and the microlens array 102 in FIG. 1 on the optical waveguide substrate 201, eliminates the necessity of individually preparing and aligning generally used components such as a fiber array or microlens array, allows the implementation load such as the requirement to provide the components at an different angle for each WSS function unit to be resolved by only designing the circuit layout, and realizes a configuration that allows further cost reduction and significant reduction of the alignment load, while preserving the considerable merit described in Embodiment 1.

Embodiment 3

FIG. 5 illustrates a configuration of an optical signal processing device according to Embodiment 3 of the invention. In Embodiment 3, an optical waveguide substrate 501, a diffraction grating 502, a lens 503, and a spatial light modulator 504 are arranged in this order.

Figure 6:
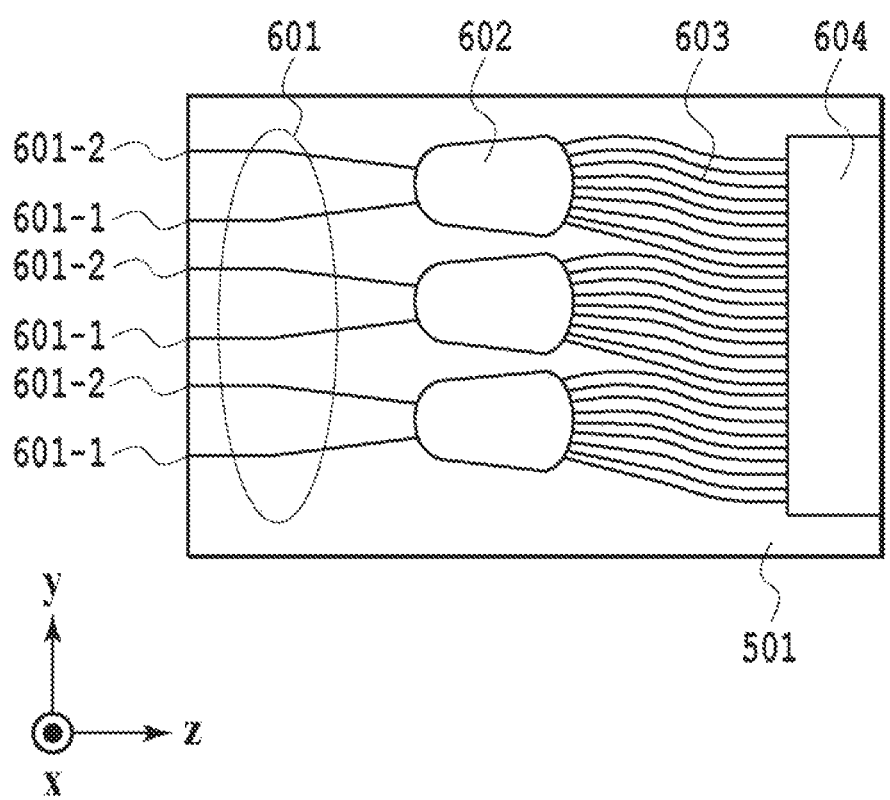
FIG. 6 is a diagram illustrating a detailed configuration of an optical waveguide substrate 501 in Embodiment 3.

FIG. 6 illustrates a detailed configuration of the optical waveguide substrate 501 in Embodiment 3. As illustrated in FIG. 6, the optical waveguide substrate 501 has at least one of the waveguides associated with a first input/output port group 601-1 or a second input/output port group 601-2, a slab waveguide 602 having an input/output port connected thereto, an array waveguide 603 connected to the slab waveguide 602, and a slab waveguide 604.

In the input/output port 601, the installation angle of the input/output port 601 is determined so that the chief rays when signal light is output from each waveguide and propagates through the slab waveguide 602 intersect at a certain point on the end of the slab waveguide 602 (boundary part between the slab waveguide 602 and the array waveguide 603). In addition, the present embodiment is characterized in that input/output ports associated with the first input/output port 601-1 and the second input/output port 601-2 are alternately arranged with regard to the y-axis direction.

Firstly, the signal light input to the first input/output port 601-1 propagates through the waveguide in the slab waveguide 602 in a manner spreading in the plane of the optical waveguide substrate 501, while being kept trapped in the x-axis direction. Since the wave surface of the spreading signal light has a curvature according to the propagation distance, the end of the slab waveguide 602 is shaped so as to conform to the curvature of the wave surface. The end of the slab waveguide 602 has connected thereto the array waveguides 603 of the same length.

Here, among the end faces of the optical waveguide substrate 501, the end face to which the array waveguide 603 is connected (end face on the side from which light is output into a space) conforms to the y-axis. When this configuration is employed, the optical signal output into the space from the array waveguide 603 is output as a planar wave with the phase aligned in the y-axis direction, and therefore propagates through the space as collimated beams with regard to the y-axis direction. The optical signals having passed through the optical waveguide substrate 501 are angularly wave-demultiplexed for each wavelength in the diffraction grating 502 and further pass through the lens 503, so as to be subjected to angular position conversion for each wavelength and perpendicularly incident on the spatial light modulator 504. The optical signals are reflected at an arbitrary angle by the spatial light modulator 504 for each wavelength, and coupled again to the optical waveguide substrate 501 via the lens 503 and the diffraction grating 502.

Figure 7:
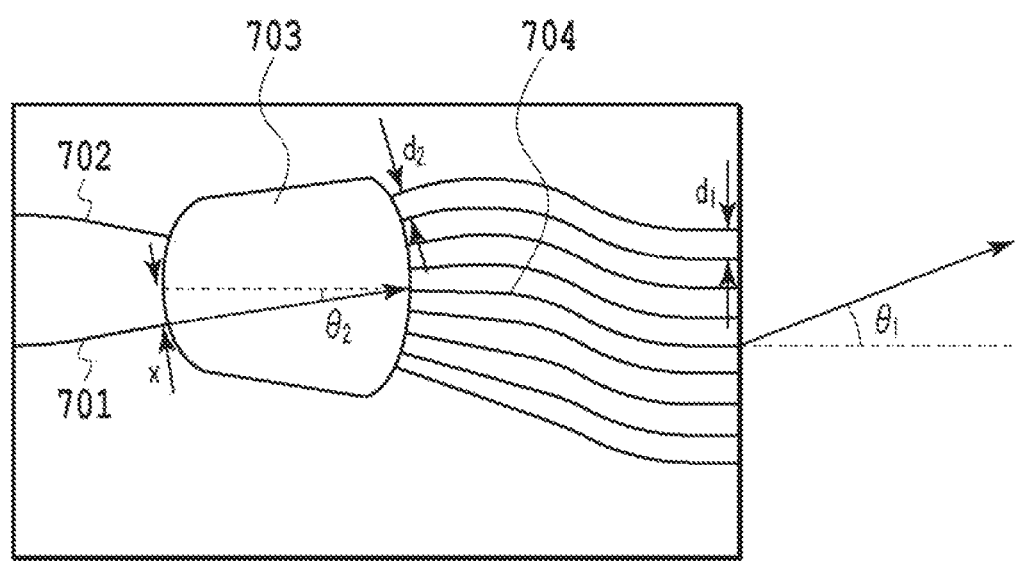
FIG. 7 is a diagram explaining details of the operation of the optical waveguide substrate 501.
Figure 8:
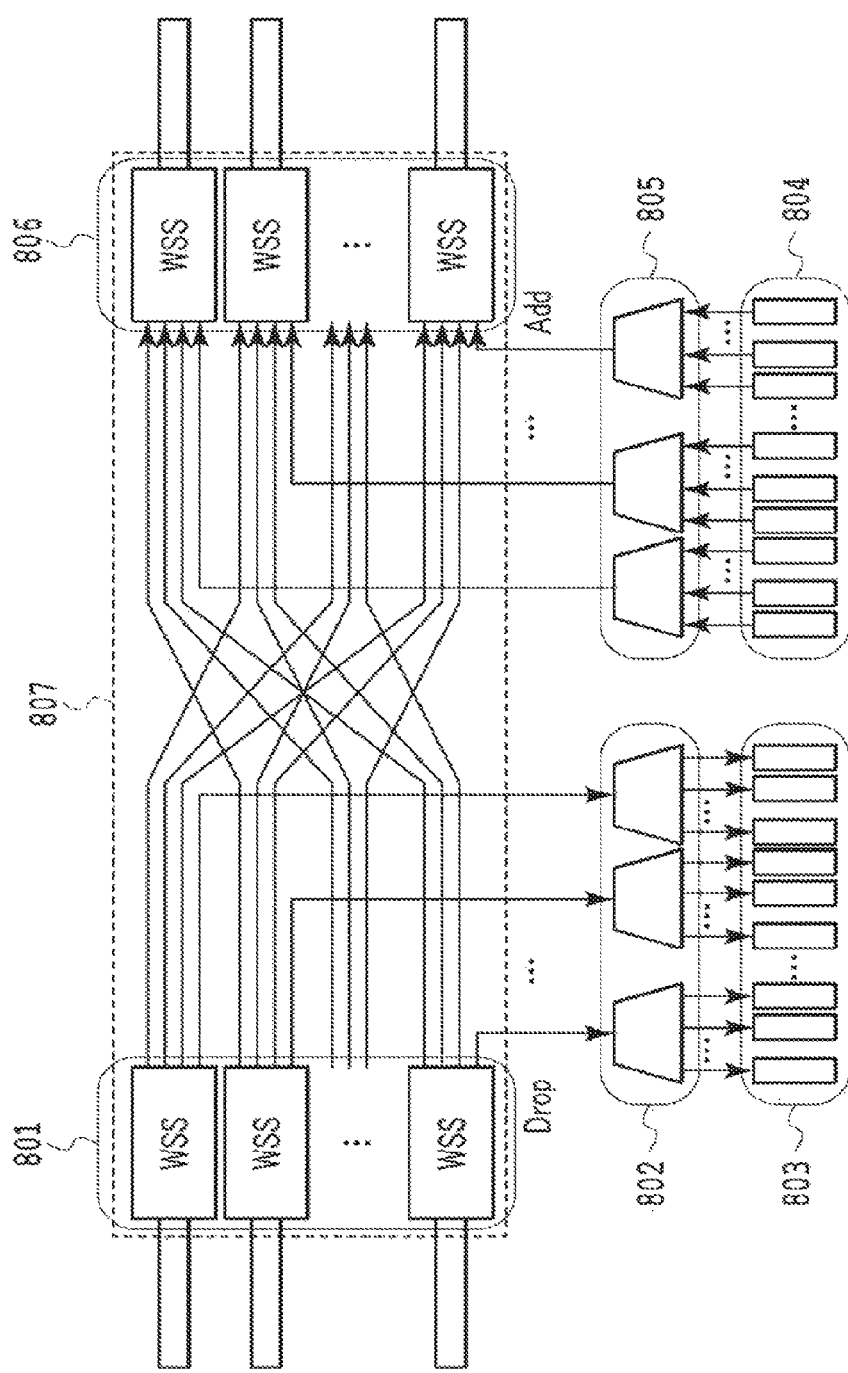
FIG. 8 is a diagram illustrating a configuration of a conventional optical signal processing device having a plurality of WSSs implemented on a single node.

FIG. 7 is a diagram explaining details of the operation of the optical waveguide substrate 501. Letting x be the distance between the first input/output port 701 and the centerline of the slab waveguide 703, $\theta_2$ be the angle, in the slab waveguide 703, between the chief ray of the signal light output from the first input/output port 701 and the z-axis, $f_{slab}$ be the length of the slab waveguide 703, $n_s$ be the refractive index of the slab waveguide 703, $d_2$ be the pitch of the array waveguide 704 connected to the slab waveguide 703, $d_1$ be the pitch of the array waveguide 704 on the end face of the optical waveguide substrate 501, and $\theta_1$ be the angle between the chief ray of the optical signal on the space side of the signal light input from the first input/output port 701 and the z-axis, the aforementioned parameters conform to the following relational equation as described in the Non Patent Literature 1.

[Formula 1]

$$\theta_2 = \arcsin\left(n_s \frac{d_1}{d_2} \sin\theta_1\right) = \arcsin\left(n_s \frac{d_1}{d_2} \sin\left(\frac{x}{f_{slab}}\right)\right) \quad (1)$$

Accordingly, with $\theta_2$ or x being different in the first input/output port 701 and the second input/output port 702, respectively, the positions from which the beams are output into the space are the same regardless of whether the optical signals are incident from the first input/output port 701 or the second input/output port 702, but the beams may be output into the space with the angle $\theta_1$ being different for each WSS function unit, whereby an optical signal processing device having a plurality of functions integrated thereon can be realized.

Embodiment 3 has an important advantage in that it allows to reduce the number of NA adjustment circuits installed in the optical waveguide substrate by half without having to arrange any additional member while preserving the merit in Embodiment 2, whereby the height of the PLC chip in the y-axis direction is reduced to ½ and simultaneously the number of circuits is also halved, which results in a higher yield in the production of PLC.

In addition, the configuration of arranging the input/output ports associated with the first input/output port 601-1 and the second input/output port 601-2 alternately with regard to the y-axis direction also brings about an effect that cross talk (leak or interference of signal light between adjacent ports) between adjacent ports of the first or the second input/output ports.

REFERENCE SIGNS LIST

101, 301, 601, 901 input/output port group
102, 902 microlens array
103, 202, 502, 905 diffraction grating
104, 203, 503, 903, 904, 906 lens
105, 204, 504, 907 spatial phase modulator
201, 501 optical waveguide substrate
302, 402, 405, 407, 602, 604, 703 slab waveguide
401 straight waveguide
403 tapered waveguide
404 lens function unit
406, 603, 704 array waveguide
701, 702 input/output port
801, 806 WSS group
802 wavelength demultiplexing function unit group
803 receiver group
804 transmitter group
805 wavelength multiplexing function unit group
807 wavelength cross connect function unit

The invention claimed is:

1. An optical signal processing device comprising:
   M light input/output units each having N input/output ports, where M is an integer greater than or equal to 2 and N is an integer greater than or equal to 1;
   a diffraction grating configured to perform wavelength demultiplexing of optical signals output from the M light input/output units;
   a focusing unit configured to respectively focus the optical signals dispersed for every wavelength by the diffraction grating; and
   a spatial light modulating unit configured to perform phase modulation on each of the optical signals focused by the focusing unit,
   wherein traveling directions of chief rays of the optical signals with the same wavelength output from each of the M light input/output units, which each have corresponding N input/output ports, are different from among the others of the M light input/output units.

2. The optical signal processing device according to claim 1, wherein chief ray of light output from the N input/output ports of each of the light input/output units respectively intersect on the same plane with one of chief rays of light output from the N input/output ports of the other light input/output unit.

3. The optical signal processing device according to claim 1, wherein the light input/output unit includes an optical waveguide substrate.

4. The optical signal processing device according to claim 3, wherein the optical waveguide substrate includes a slab waveguide provided at an input/output end on the side of the diffraction grating.

5. The optical signal processing device according to claim 4, wherein the optical waveguide substrate includes a numerical aperture control mechanism configured to control a numerical aperture of light output from the optical waveguide substrate into a space.

6. The optical signal processing device according to claim 5, wherein the numerical aperture control mechanism includes a tapered structure in which a waveguide width of the optical waveguide substrate varies according to the traveling direction of light in a waveguide.

7. The optical signal processing device according to claim 5, wherein the numerical aperture control mechanism includes:
   a slab waveguide; and
   a lens mechanism having a power only in a plane of the optical waveguide substrate.

8. The optical signal processing device according to claim 5, wherein the numerical aperture control mechanism includes:
   at least one slab waveguide; and
   an arrayed waveguide connected to the slab waveguide.

9. The optical signal processing device according to claim 8, wherein all the waveguides in the arrayed waveguide have the same optical length.

10. The optical signal processing device according to claim 8, wherein the total number of the numerical aperture control mechanisms is less than N×M.

11. The optical signal processing device according to claim 2, wherein the light input/output unit includes an optical waveguide substrate.

12. The optical signal processing device according to claim 11, wherein the optical waveguide substrate includes a slab waveguide provided at an input/output end on the side of the diffraction grating.

13. The optical signal processing device according to claim 12, wherein the optical waveguide substrate includes a numerical aperture control mechanism configured to control a numerical aperture of light output from the optical waveguide substrate into a space.

14. The optical signal processing device according to claim 13, wherein the numerical aperture control mechanism includes a tapered structure in which a waveguide width of the optical waveguide substrate varies according to the traveling direction of light in a waveguide.

15. The optical signal processing device according to claim 13, wherein the numerical aperture control mechanism includes:
   a slab waveguide; and
   a lens mechanism having a power only in a plane of the optical waveguide substrate.

16. The optical signal processing device according to claim 13, wherein the numerical aperture control mechanism includes:
   at least one slab waveguide; and
   an arrayed waveguide connected to the slab waveguide.

17. The optical signal processing device according to claim 16, wherein all the waveguides in the arrayed waveguide have the same optical length.

18. The optical signal processing device according to claim 16, wherein the total number of the numerical aperture control mechanisms is less than N×M.

19. The optical signal processing device according to claim 1, wherein the traveling directions are defined by a waveguide structure of the M light input/output units.

* * * * *